US012631342B2

(12) United States Patent
Todd et al.

(10) Patent No.: US 12,631,342 B2
(45) Date of Patent: May 19, 2026

(54) COOKTOP COVER FOR RECREATIONAL VEHICLES

(71) Applicant: Haier US Appliance Solutions, Inc., Wilmington, DE (US)

(72) Inventors: Justin Patrick Todd, Louisville, KY (US); Matthew Huntington, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 276 days.

(21) Appl. No.: 18/357,352

(22) Filed: Jul. 24, 2023

(65) Prior Publication Data

US 2025/0035318 A1     Jan. 30, 2025

(51) Int. Cl.
*F24C 15/12*      (2006.01)
*B60N 3/16*      (2006.01)
*F24C 3/08*      (2006.01)

(52) U.S. Cl.
CPC ............... *F24C 15/12* (2013.01); *B60N 3/16* (2013.01); *F24C 3/085* (2013.01)

(58) Field of Classification Search
CPC ............. F24C 15/12; F24C 3/085; B60N 3/16
USPC .................. 126/39 E, 39 R, 214 R, 215, 211
See application file for complete search history.

(56) References Cited

U.S. PATENT DOCUMENTS

| | | | | |
|---|---|---|---|---|
| 5,115,797 | A | 5/1992 | Hurner | |
| 6,543,439 | B1 | 4/2003 | Köllner | |
| 6,763,825 | B1 * | 7/2004 | Geible | .................... F24C 15/00 |
| | | | | 126/214 R |
| 10,527,292 | B2 | 1/2020 | Bell | |
| 2016/0305669 | A1 * | 10/2016 | Sanquist | ................. F24C 15/12 |

OTHER PUBLICATIONS

Camping World, "Camco Silent Stovetop Cover", Item #83402, CWI, LLC 2023, Retrieved from Internet: https://www.campingworld. com/camco-silent-stovetop-cover-83402.html?utm_source=google &utm_medium=ppc&utm_campaign=%7bCampaign%7d&gclid= CjwKCAjwu_mSBhAYEiwA5BBmf939G6F_-Tmpw6Y14u- LbKGpJfA6S9vmZlyKKqMKX2lg-GhJ-SgHbhoCVEUQAvD_BwE &gclsrc=aw.ds.

* cited by examiner

*Primary Examiner* — Vivek K Shirsat
(74) *Attorney, Agent, or Firm* — Dority & Manning, P.A.

(57)     ABSTRACT

A cover for a cooktop appliance includes a panel defining a top surface and a bottom surface. The top surface and the bottom surface are vertically spaced apart when the cover is in a mounted position on a grate of the cooktop appliance. The cover also includes a plurality of feet attached to the bottom surface of the panel. Each foot of the plurality of feet is configured to interface with the grate when the cover is in the mounted position on the grate.

14 Claims, 12 Drawing Sheets

COOKTOP COVER FOR RECREATIONAL VEHICLES

FIELD OF THE INVENTION

The present subject matter relates generally to cooktop appliances and covers for such appliances. In particular, the present subject matter relates to cooktop covers which may be used in kitchens where additional counter space is desired, such as in smaller kitchens as may be found, e.g., in recreational vehicles.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, burners may be included with each heated portion. The heated portions utilize one or more heating sources to output heat, which is transferred to the cooking utensil and thereby to any food item or items that are disposed on or within the cooking utensil.

Such cooking appliances, e.g., cooktop appliances, may be used in a setting where additional counter space is desired. For example, a smaller kitchen, e.g., in a recreational vehicle (RV), may have limited counter space. An RV is a motor vehicle or trailer that includes amenities such as kitchens, bathrooms, and one or more sleeping areas. Kitchens of recreational vehicles can have typical household appliances such as refrigerators, ovens, cooktops, ranges, and microwaves. Generally, kitchens in RV's have limited counter space to store items or prepare food. Installed in the counter, ranges or cooktops in recreational vehicles can take up valuable countertop space when not being used.

Accordingly, cooktop appliances and covers for such appliances which increase usable counter space in a kitchen, such as a small kitchen, e.g., in an RV, would be advantageous.

BRIEF DESCRIPTION OF THE INVENTION

Aspects and advantages of the invention will be set forth in part in the following description, or may be apparent from the description, or may be learned through practice of the invention.

In one example embodiment, a cooktop appliance is provided. The cooktop appliance defines a vertical direction, a lateral direction, and a transverse direction. The cooktop appliance includes a top panel with a burner disposed on the top panel and a grate mountable on the top panel. A cover is selectively mountable to the grate and fully removable from the grate. The cover includes a panel. The panel defines a top surface and a bottom surface. The top surface and the bottom surface are spaced apart along the vertical direction when the cover is in a mounted position on the grate and the grate is in a mounted position on the top panel. The cover also includes a plurality of feet attached to the bottom surface of the panel. Each foot of the plurality of feet is configured to interface with the grate when the cover is in the mounted position on the grate.

In another example embodiment, a cover for a cooktop appliance is provided. The cooktop appliance defines a vertical direction, a lateral direction, and a transverse direction. The cooktop appliance includes a top panel with a burner disposed on the top panel and a grate mountable on the top panel. The cover includes a panel. The panel defines a top surface and a bottom surface. The top surface and the bottom surface are spaced apart along the vertical direction when the cover is in a mounted position on the grate and the grate is in a mounted position on the top panel. The cover also includes a plurality of feet attached to the bottom surface of the panel. Each foot of the plurality of feet is configured to interface with the grate when the cover is in the mounted position on the grate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
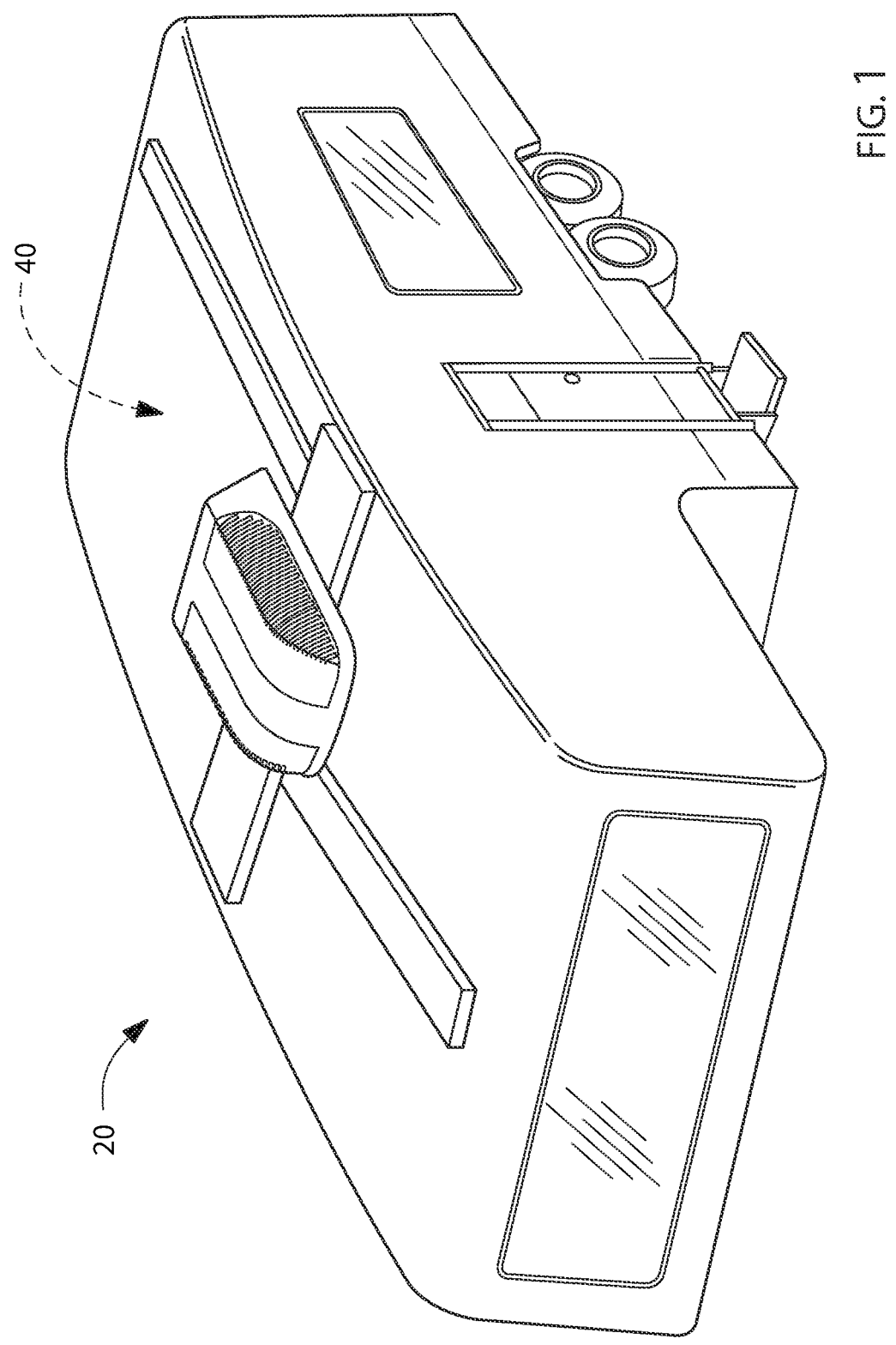
FIG. 1 provides a perspective view of an example recreational vehicle.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

In general, FIG. 1 provides a perspective view of an example recreational vehicle 20 in accordance with aspects of the present disclosure. In general, recreational vehicles may be motorized (drivable) or non-motorized (towable) vehicles that are used for camping, traveling, and other recreational activities. In the current example embodiment, recreational vehicle 20 is a non-motorized recreational vehicle 20, although one of skill in the art would understand that aspects of the present subject matter may be used in either motorized or non-motorized recreational vehicles. In general, recreational vehicle 20 defines a passenger compartment 40 which may include amenities such as kitchens, bathrooms, one or more sleeping areas with beds, and multiple compartments for storing items. Thus, recreational vehicle 20 may be employed for a variety of purposes including transportation, cooking, eating, sleeping, entertaining, and more of the like.

Figure 2:
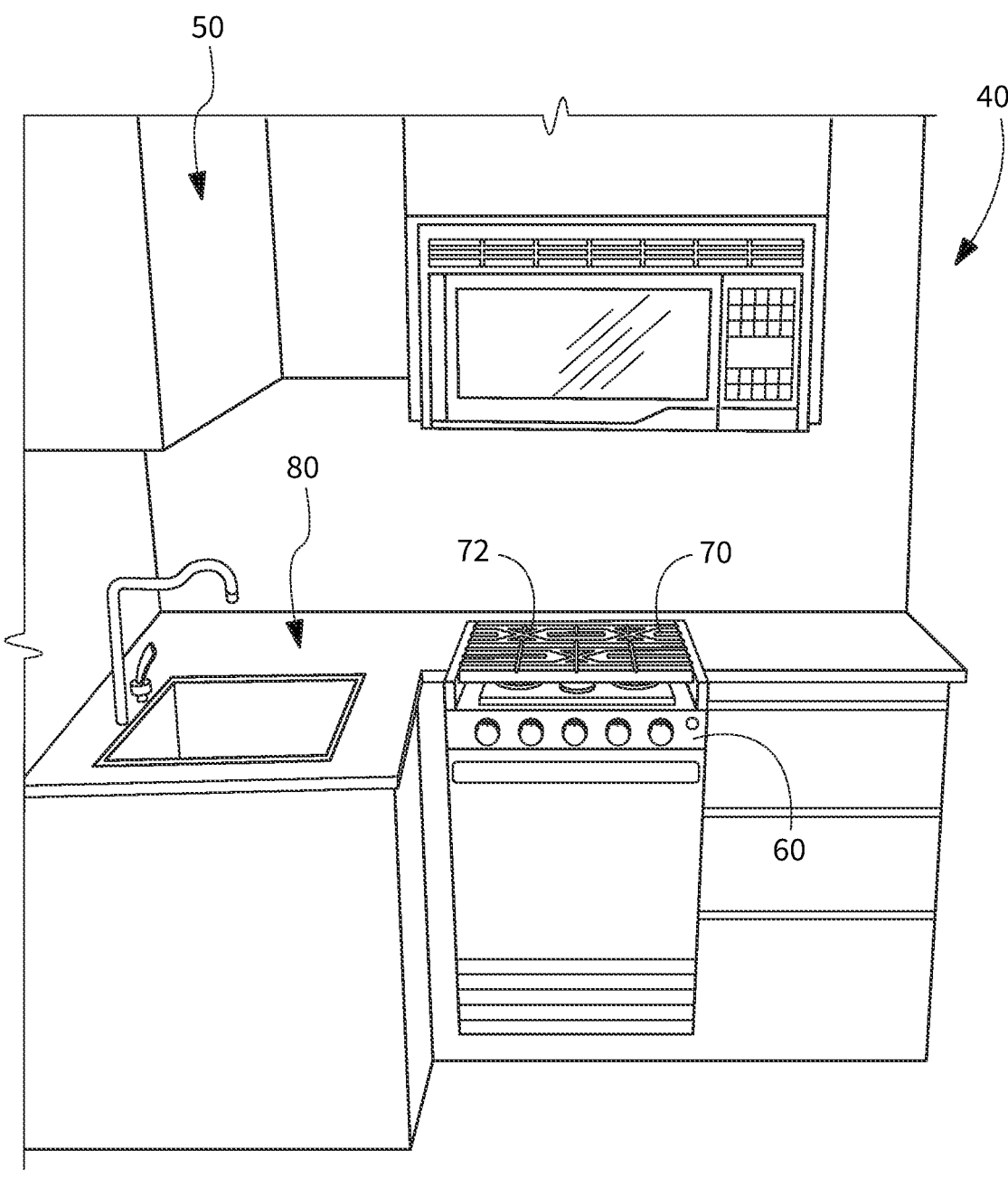
FIG. 2 provides a perspective view of an example kitchen within the recreational vehicle of FIG. 1.
Figure 3:
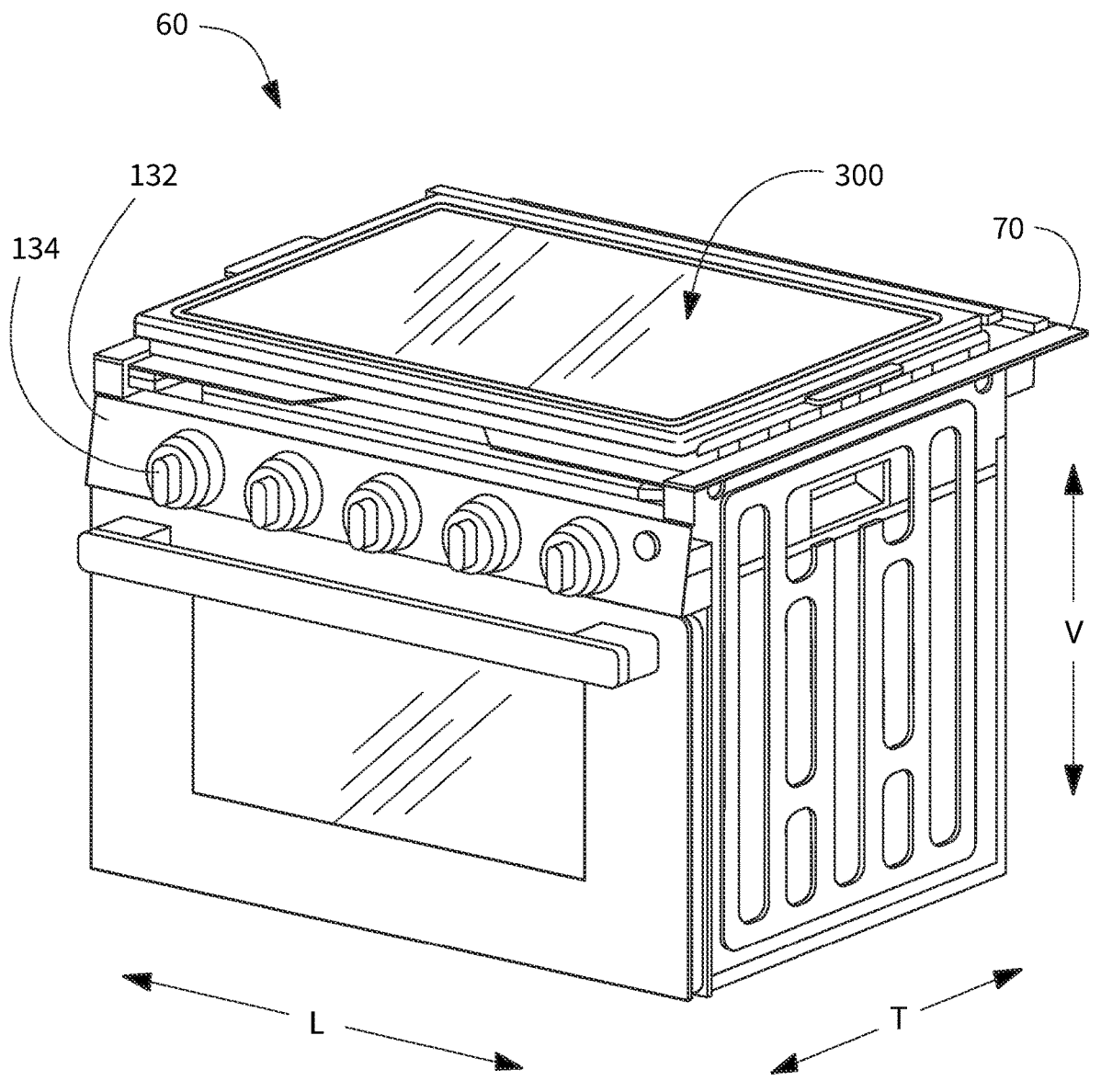
FIG. 3 provides a perspective view of an example cooktop appliance with a cover thereon according to one or more exemplary embodiments of the present disclosure that may be used in a kitchen such as the kitchen of FIG. 2.

As may be seen in FIGS. 2 and 3, passenger compartment 40 of recreational vehicle 20 may include a kitchen 50 for cooking, preparing, and storing food. FIG. 2 provides a perspective view of an example kitchen 50. In general, kitchen 50 may include typical household appliances, e.g., a refrigerator, an oven, a cooktop, and a microwave. In the current example embodiment, a cooktop appliance, e.g., range 60, may be included in kitchen 50. Additionally, kitchen 50 may include a countertop 80 generally configured for the receipt, storage, and preparation of food items. In the example illustrated in FIGS. 2 and 3, the cooktop appliance is a range 60 which includes a cooktop and an oven chamber. In additional embodiments, a cooktop appliance according to the present disclosure may include more than one oven chamber (e.g., a double oven) or may be a standalone cooktop appliance. The cooktop appliance 70 may be inserted into countertop 80, e.g., cooktop 70 may be integrated into and thus reduce the horizontal surface area, e.g., counter space, of countertop 80. In general, cooktop 70 may be an electric or gas cooktop with heating elements configured to provide heat to items placed thereon.

FIG. 3 illustrates an example embodiment of range appliance 60 including a cooktop. Thus, the range appliance 60 is one example embodiment of a cooktop appliance 70 according to the present disclosure. In additional embodiments, a cooktop appliance may also be a standalone cooktop appliance (e.g., without an oven or cooking chamber), or may be a double oven appliance, among other possible variations. Thus, it should be understood that the range appliance 60 is illustrated by way of example and without limiting the cooktop appliance to any particular configuration, e.g., of the controls (user interface panel and user inputs), oven chamber (or any oven at all), or other components.

As illustrated in FIG. 3, a cover 300 may be positioned on the cooktop of the range appliance 60, and, in additional embodiments, the cover 300 may be positioned on any suitable cooktop appliance 70. In general, cover 300 may be configured for providing additional usable horizontal surface area on the cooktop appliance 70. For example, cover 300 may be generally configured for withstanding heat from heating elements of cooktop appliance 70 in the event the heating elements were recently, or are actively, heating.

The cooktop appliance 70 may also include a user interface panel 132 located within convenient reach of a user of the cooktop appliance 70. In various embodiments, the user interface panel may include user inputs 134, such as knobs, switches, buttons, or a touchscreen, etc., which are generally understood by those of ordinary skill in the art and are therefore not shown or described in extensive detail herein for the sake of brevity and clarity. The user inputs 134 may allow the user to activate one or more burners and determine an amount of heat provided by each gas burner. The user interface panel 132 may also be provided with one or more graphical display devices that deliver certain information to the user, e.g., whether a particular burner is activated and/or the level at which the burner is set.

Figure 4:
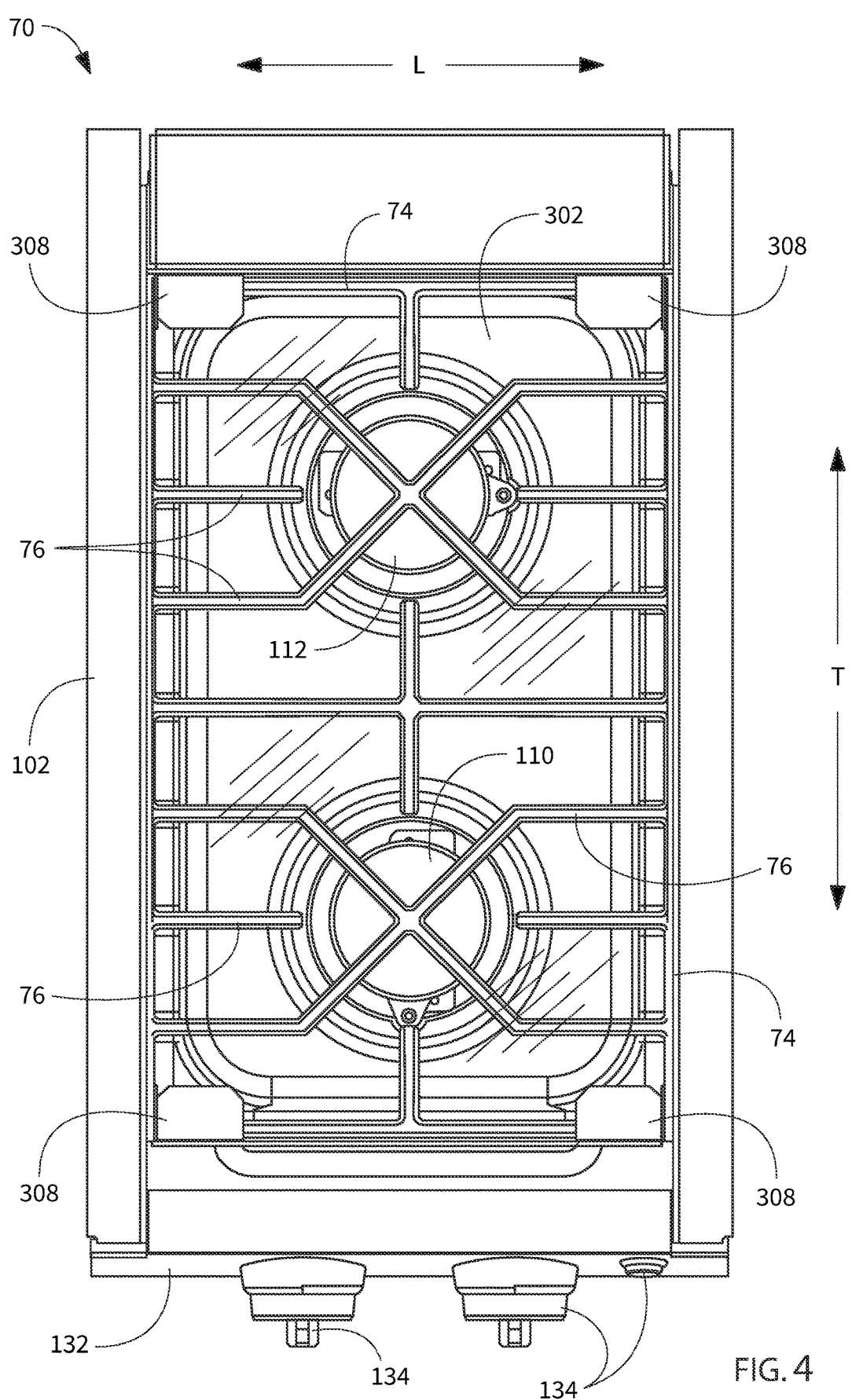
FIG. 4 provides a plan view of another example cooktop appliance with a cover thereon according to one or more additional exemplary embodiments of the present disclosure that may be used in a kitchen such as the kitchen of FIG. 2.

FIG. 4 illustrates another example embodiment of the cooktop appliance 70 with a cover 300 thereon. The cooktop appliance in this particular example includes two burners. In various embodiments, the cooktop appliance may include any suitable number of burners, such as one burner, or more than two burners, e.g., three burners, four burners, etc. In some embodiments, e.g., as illustrated in FIG. 4, the cover 300 may include a panel 302, and the panel 302 may be comprised of a translucent or transparent material, such as glass, such as tinted glass. Thus, the cover 300 may be mountable on top of the cooktop appliance 70 and components of the cooktop appliance 70 below the cover 300 may be visible through the panel 302, e.g., through the glass of the panel 302 of the cover 300. Accordingly, the burners 110 and 112 and the grate 72 are visible in FIG. 4 through the glass panel 302. The cover 300 may be fully removably mounted on the cooktop appliance 70, such as the cover 300 may include resilient feet 308 which interface with the grate 72 to retain the cover 300 on the cooktop appliance 70 and to minimize vibration of the cover, such that the cover 300 may be fully removed from the cooktop appliance 70 without removing or undoing any mechanism such as a latch, hinge, or fastener, etc., which retains the cover 300 on the cooktop appliance 70.

Figure 5:
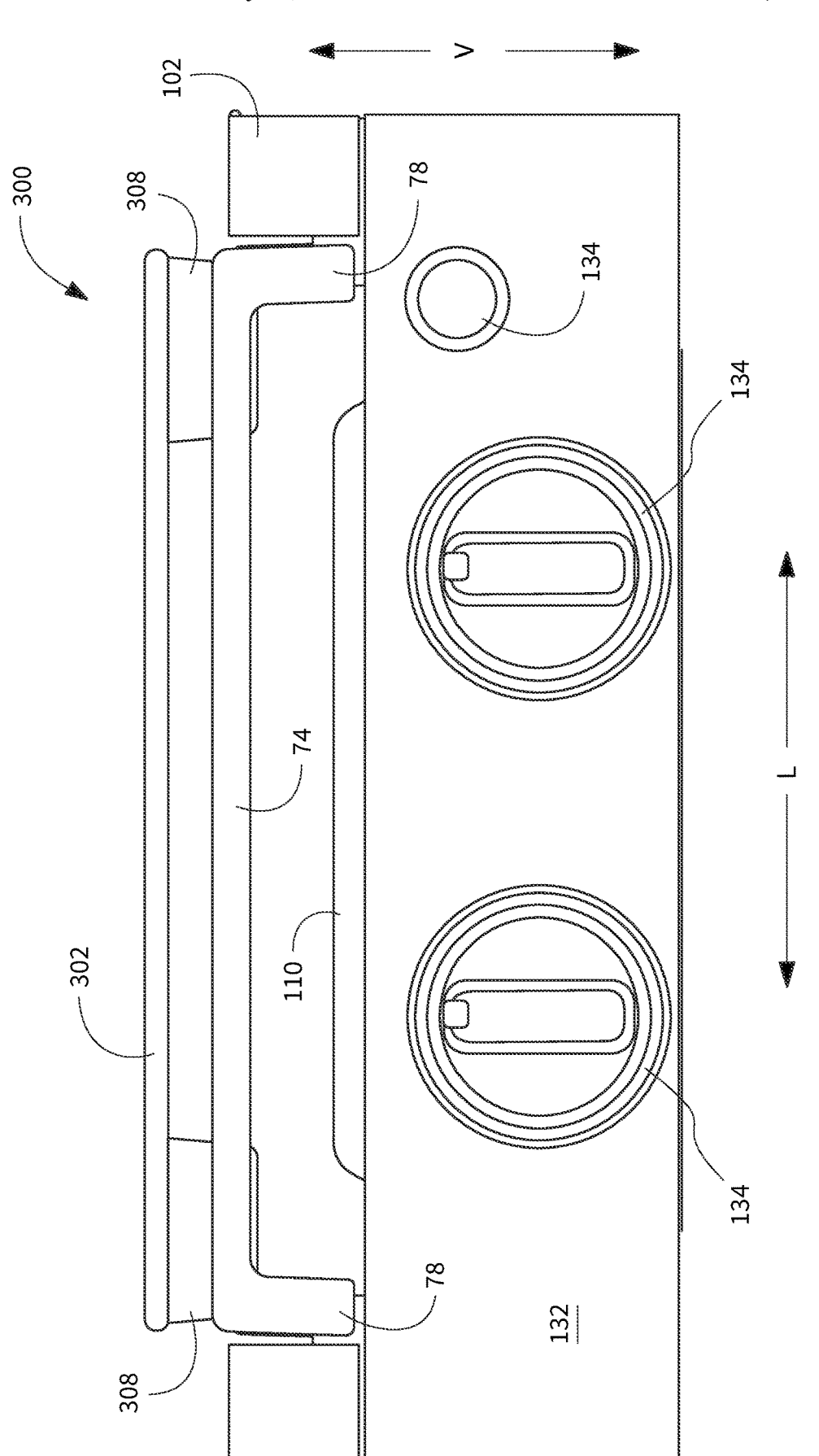
FIG. 5 provides a front view of the cooktop appliance and cover of FIG. 4.

As may be seen, e.g., in FIGS. 2, 4, and 5, in some embodiments, the cooktop appliance 70 includes one or more grates 72. The grates 72 may be removably received on a top panel 102 (FIGS. 6 and 7) of the cooktop appliance 70 such that each grate 72 extends at least partially above a corresponding burner 110, 112 when the grates 72 are in a mounted position on the top panel 102. Generally, each grate 72 is configured for supporting a cooking utensil, such as a pot, pan, etc., on top of the grate 72 and above one of the gas burners 110, 112 when the grate 72 is in the mounted position on the top panel 102. For example, each grate 72 may include an outer frame 74 which extends around and defines an outer perimeter of the grate 72 with a plurality of fingers 76, where each finger 76 extends inward from the outer frame 74, e.g., whereby the fingers 76 extend over one or more respective burners 110 or 112 and a cooking utensil may be supported on top of the fingers 76 of the grate 72 above one of the burners as described.

As may be seen in FIG. 5, the grate 72 (or each grate 72 in embodiments where more than one grate 72 is provided) may also include a plurality of legs 78 which extend downward from the outer frame 74 of the grate 72. For example, a leg 78 may be provided at each corner of the grate 72, such as four legs 78 one at each of four corners of the outer frame 74 of the grate 72 in embodiments where the grate 72 is rectangular. As will be described further below, the cover 300 may include a plurality of feet 308, and each foot 308 of the plurality of feet 308 may be configured to interface with the grate 72, such as with the outer frame 74 and/or one or more of the fingers 76 of the grate 72, when the cover 300 is in the mounted position on the grate 72. As may be seen in FIGS. 4 and 5, each foot 308 of the cover 300 may correspond to, e.g., may generally overlie, one of the legs 78 of the grate 72 when the cover 300 is in the mounted position on top of the grate(s) 72.

Figure 6:
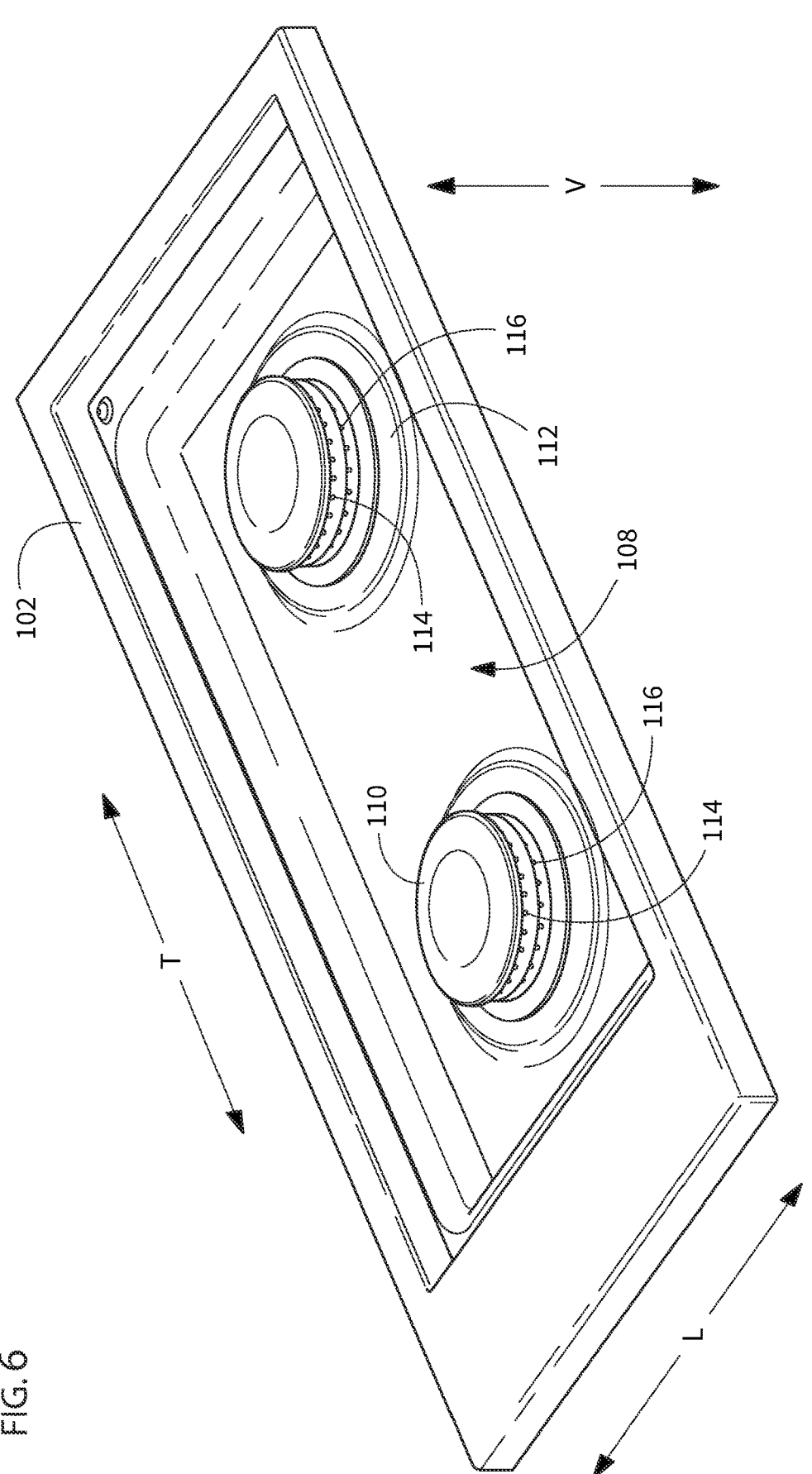
FIG. 6 provides a perspective view of the cooktop appliance of FIG. 4 with the cover and grates removed.
Figure 7:
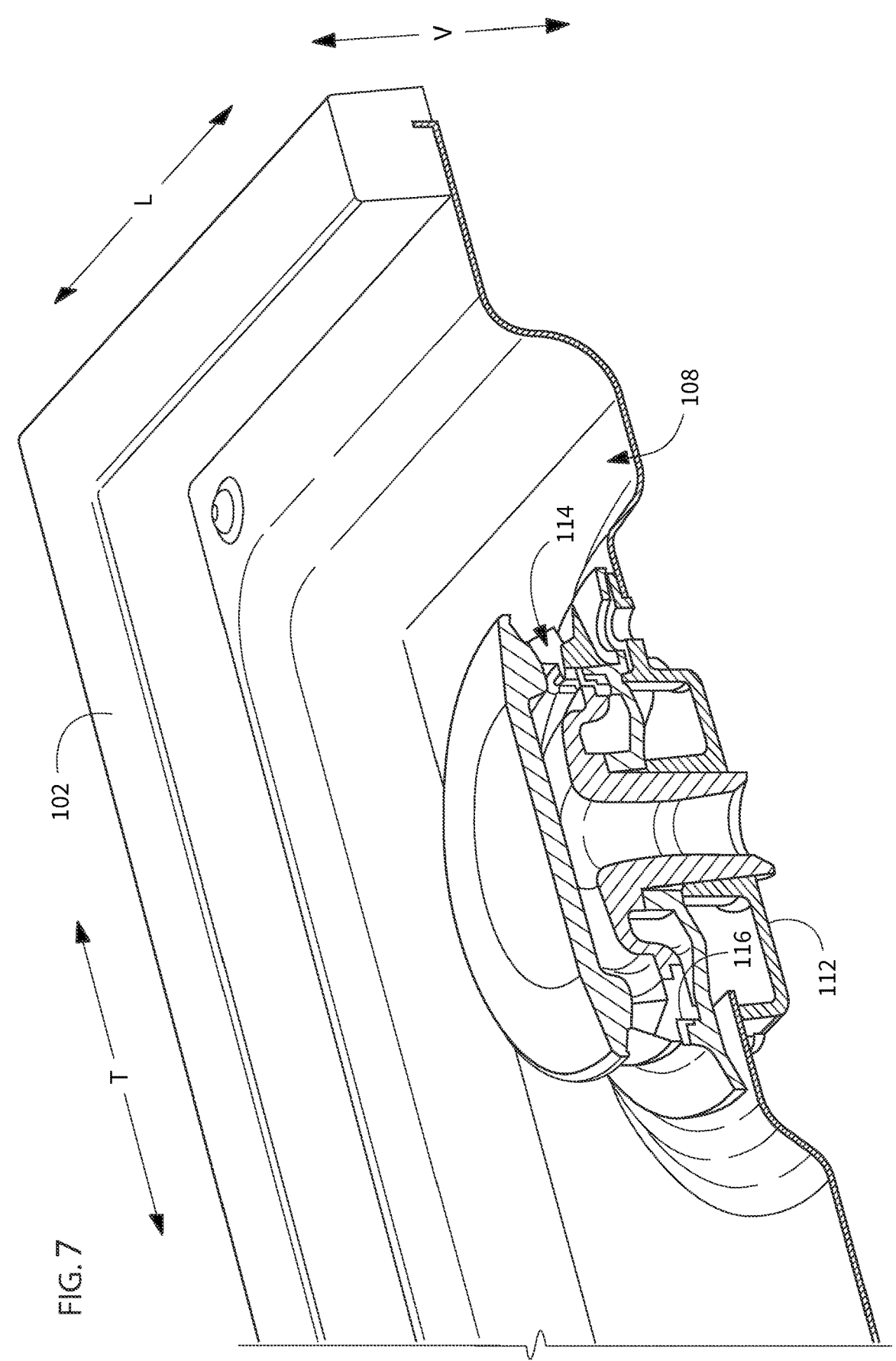
FIG. 7 provides an enlarged section view of a portion of the cooktop appliance of FIG. 6.

Referring now to FIGS. 6 and 7, gas burners of the cooktop appliance 70 may be more clearly seen with the grate 72 and cover 300 removed as illustrated in FIGS. 6 and 7. The example cooktop appliance 70 includes a top panel 102. The top panel 102 may, for example, be constructed of enameled steel, stainless steel, glass, ceramics, and combinations thereof. The cooktop appliance 70 may include a plurality of burners. For example, the cooktop appliance 70 may include a first burner 110 disposed on the top panel 102 and a second burner 112 spaced apart from the first burner 110 on the top panel 102. For example, as illustrated, the first burner 110 and the second burner 112 may be aligned along a first direction and spaced apart along a second direction perpendicular to the first direction. The top panel 102 may also include a recessed portion 108, e.g., which extends downward along a vertical direction V. The first and second burners 110 and 112 may be positioned within the recessed portion 108. The recessed portion 108 may collect spilled material, e.g., foodstuffs, during operation of the cooktop appliance.

Generally, each gas burner 110, 112 includes a generally circular shape from which a flame may be emitted. As shown, each gas burner 110, 112 includes a plurality of fuel ports 114 defined circumferentially around the gas burner and in fluid communication with an internal passage of each respective burner 110, 112. In some embodiments, e.g., as illustrated in FIGS. 6 and 7, one or both of the first burner 110 and the second burner 112 may be a multi-ring burner. For example, as illustrated in FIG. 6, the first burner 110 may include a first plurality of fuel ports 114 defining a first ring of the burner 110 and a second plurality of fuel ports 116 defining a second ring of the burner 110. In such embodiments, a first fuel chamber in fluid communication with the first plurality of fuel ports 114 may be separated from a second fuel chamber in fluid communication with the second plurality of fuel ports 116 by a wall within the burner 110, and the burner may be configured to selectively supply fuel to one or both of the fuel chambers (exemplary fuel chambers may be seen in FIG. 7 but are not specifically labelled). In some embodiments of a cooktop appliance, multiple burners of differing types may be provided in combination, e.g., one or more single-ring burners as well as one or more multi-ring burners. Moreover, other suitable burner configurations are also possible.

Figure 8:
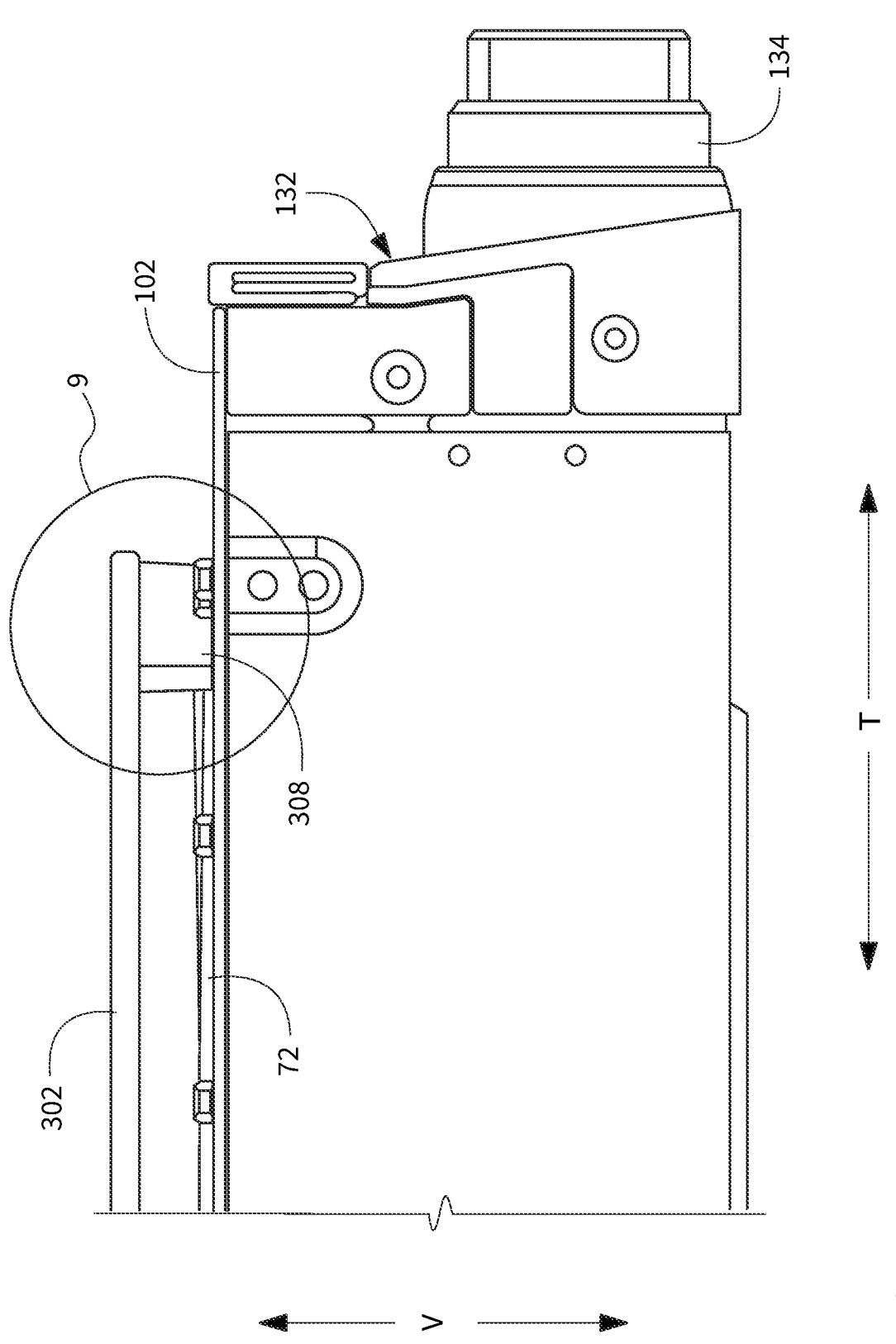
FIG. 8 provides a side view of a front portion of the cooktop appliance and cover of FIG. 4.
Figure 9:
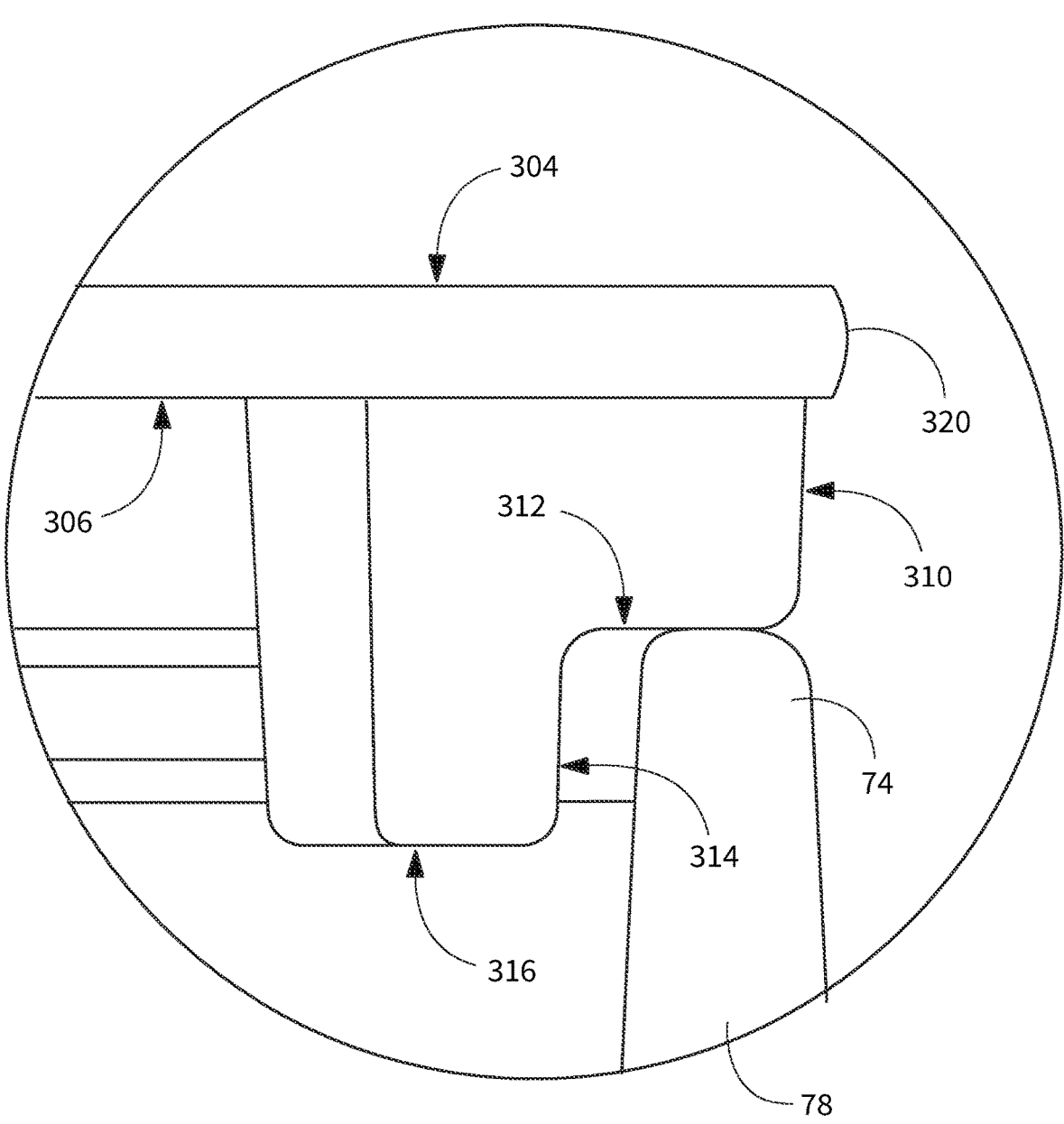
FIG. 9 provides an enlarged view of a portion of FIG. 8.

FIG. 8 provides a side view of a front portion of the cooktop appliance 70 and the cover 300, with the cover 300 in a mounted position on top of grate 72 while grate 72 is mounted on top panel 102 of the cooktop appliance 70, and FIG. 9 provides an enlarged view of the portion of FIG. 8 within circle 9 in FIG. 8. As may be seen in FIGS. 8 and 9, when the cover 300 is mounted on the grate 72, each foot 308 of the cover 300 may rest on the outer frame 74 of the grate 72.

For example, each foot 308 may include a first outer surface 310 and a second outer surface 314. As may be seen, e.g., in FIG. 9, the first outer surface 310 and the second outer surface 314 may face outwards, e.g., away from a center of the cover 300 along a direction that is generally perpendicular to the vertical direction V, such as a horizontal direction, such as one of the lateral direction L and the transverse direction T. The first outer surface 310 and the second outer surface 314 may be spaced apart, e.g., offset along a direction perpendicular to the vertical direction V, such as with a middle surface 312 of the foot 308 between the first outer surface 310 and the second outer surface 314 whereby a length of the middle surface 312 defines the offset between the first outer surface 310 and the second outer surface 314.

As best seen in FIG. 9, when the cover 300 is in the mounted position on top of the grate(s) 72, the second outer surface 314 of one or more feet 308 of the plurality of feet 308 may be in contact with the grate 72, such as in contact with an inner surface of the outer frame 74 of the grate 72. For example, in some embodiments, the second outer surface 314 of each foot 308 may be in contact with the grate 72 when the cover 300 is in the mounted position, whereas in other embodiments the second outer surface 314 of feet 308 on one side of the cover 300 (e.g., one of the left side or right side) may be in contact with the grate 72 while the feet 308 on the opposite side (e.g., the other of the left side or right side) may be spaced apart from the inner surface of the grate 72 along the lateral direction L and/or the transverse direction T. As additional examples, in some embodiments, only one of the feet 308 may have the second outer surface 314 thereof in contact with the grate 72 in the mounted position, or the second outer surface 314 of each of the feet 308 may be spaced apart from the grate 72. The middle surface 312 of each foot 308 may face generally downward along the vertical direction V. When the cover 300 is in the mounted position on top of the grate(s) 72, the middle surface 312 of each foot 308 may contact, e.g., may rest on, an upper surface of the grate 72, such as the middle surface 312 of each foot 308 may contact and be supported by a top surface of the outer frame 74 of the grate 72.

In some embodiments, e.g., as illustrated in FIG. 9, the panel 302 of the cover 300 may be spaced apart from the grate 72, such as above the grate 72 along the vertical direction V, when the cover 300 is in the mounted position on the grate 72. For example, a vertical height of the first outer surface 310 of the foot 308 may define a vertical offset distance of the panel 302 above the grate 72. The vertical offset distance may also be defined by a vertical height of an upper portion of the foot 308, where the upper portion of the foot 308 is bounded by the first outer surface 310, middle surface 312, and a top surface 318 (FIG. 12) of the foot 308. Also as may be seen in FIG. 9, each foot 308 may include a bottom surface 316 which may be parallel to and aligned with or below a bottom surface of the outer frame 74 of the grate 72.

The panel 302 may define a top surface 304 and a bottom surface 306 opposite the top surface 304. For example, the top surface 304 and the bottom surface 306 may be spaced apart along the vertical direction V. As mentioned, the panel 302 of the cover 300 may comprise a glass material. For example, the panel 302 may comprise a smooth-textured, tempered glass material. Additionally, a pencil edge 320 (FIG. 9), e.g., a convex curved edge, may be provided and the pencil edge 320 may extend fully around a perimeter of the panel 302. Additionally, the panel 302 may be a single piece, and the one-piece panel may define the entire top surface of the cover 300, e.g., the top surface 304 of the panel 302 may be the only top surface of the cover 300 and may be the whole and complete top surface of the cover 300. Thus, for example, the cover 300 may provide a maximum usable surface area, e.g., as a supplement to counter space in the kitchen 50, in the available space above the cooktop appliance 70, such as without any joints, e.g., hinges, or seams, or other interruptions in the usable work space on top of the cover 300. Accordingly, in some embodiments, e.g., as may be seen in FIGS. 3 through 5, the top surface 304 of the panel 302 may be uninterrupted in one or both of the lateral direction L and the transverse direction T, and the top surface 304 of the panel 302 may span continuously across all burners, e.g., 110 and 112 (or all three burners, all four burners, etc. in various embodiments), of the cooktop appliance 70 along one or both of the lateral direction L and the transverse direction T when the cover 300 is in the mounted position on the grate 72 and the grate 72 is mounted on the top panel 102 of the cooktop appliance 70.

Figure 10:
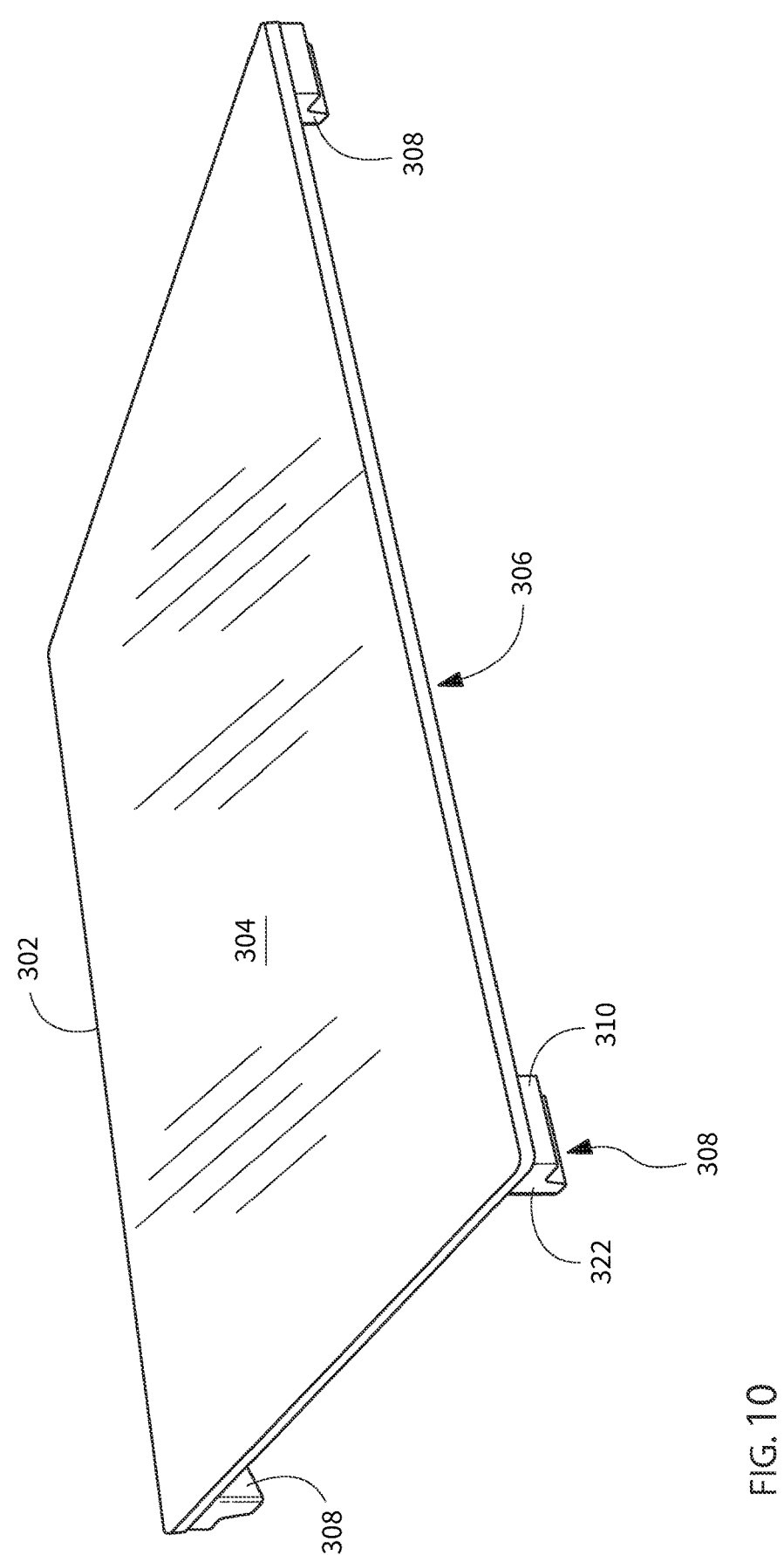
FIG. 10 provides a top perspective view of an exemplary cover for a cooktop appliance according to one or more exemplary embodiments of the present disclosure.
Figure 11:
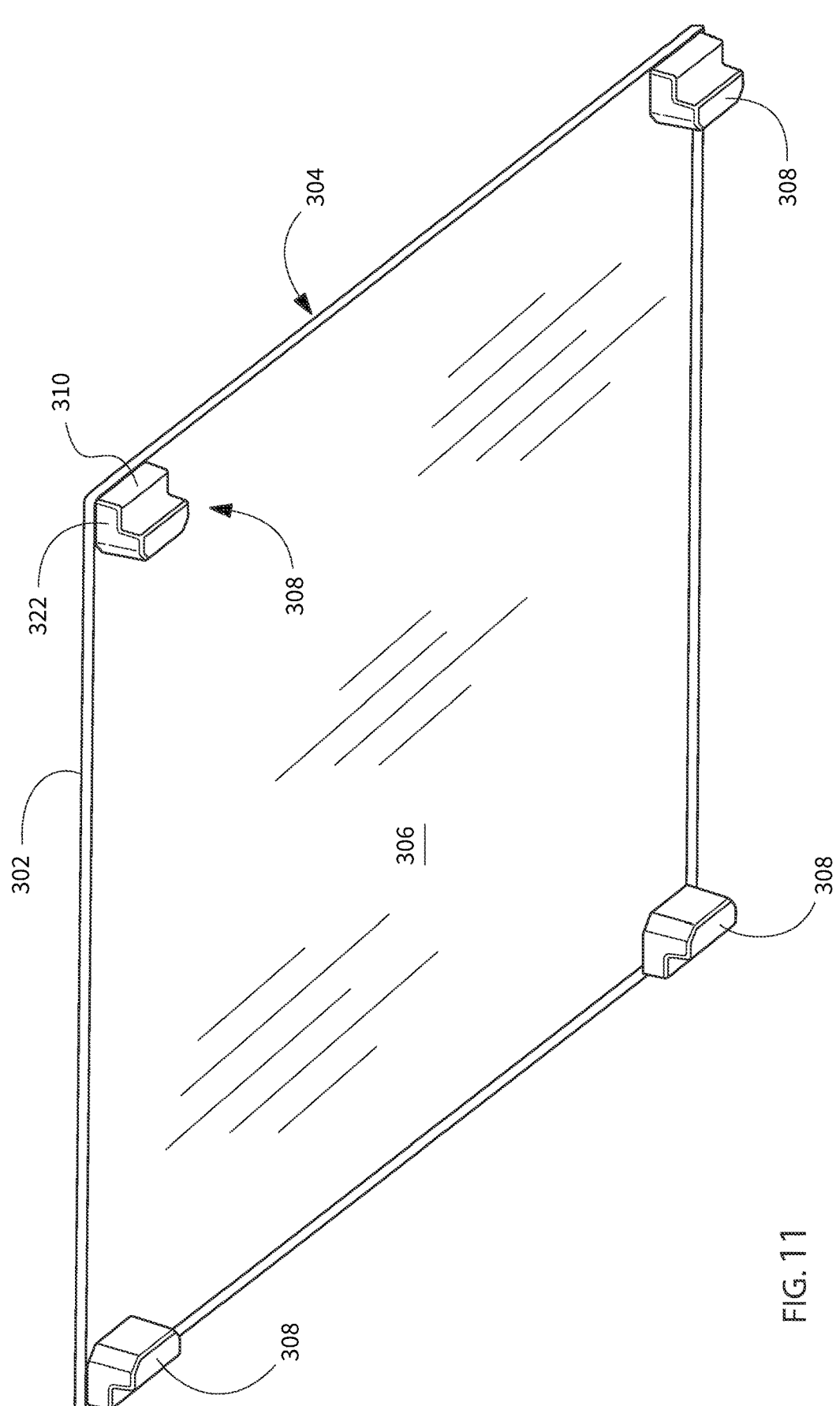
FIG. 11 provides a bottom perspective view of the cover of FIG. 10.

As seen in FIGS. 10 and 11, cover 300 may include one or more feet 308 generally configured for positioning cover on cooktop 70. Feet 308 may be attached to the bottom surface 306 of the panel 302 of the cover 300. The feet 308 may be made of silicone or any other material suitable for withstanding heat from cooktop 70. In the current example embodiment, cover 300 includes four silicone feet 308. In general, feet 308 may be attached to panel 302 at bottom surface 306 by any suitable fastener, e.g., adhesive, such as double-sided tape. For example, the adhesive may be applied to one or both of the bottom surface 306 of the panel 302 and the top surface 318 (FIG. 12) of each foot 308. In some embodiments, each foot 308 may be attached to the bottom surface 306 of the panel 302 at a corner of the panel 302, e.g., such that the first outer surface 310 is aligned with a first side of the panel 302 and a third outer surface 322 of the foot 308 is aligned with a second side of the panel 302, the second side adjoining the first side of the panel 302 at the corner of the panel 302. In additional embodiments, some of the feet 308 may be attached at one or more corners of the panel 302 in combination with one or more feet attached to the bottom surface 306 of the panel 302 at an edge of the bottom surface 306 away from the corner, such as approximately at a middle of the edge, or one or more feet 308 may also or instead be attached to the bottom surface 306 of the panel 302 at an interior of the bottom surface 306 (e.g., spaced apart from all edges and corners of the bottom surface 306), such as at or approximately at a center of the bottom surface 306 of the panel 302.

Figure 12:
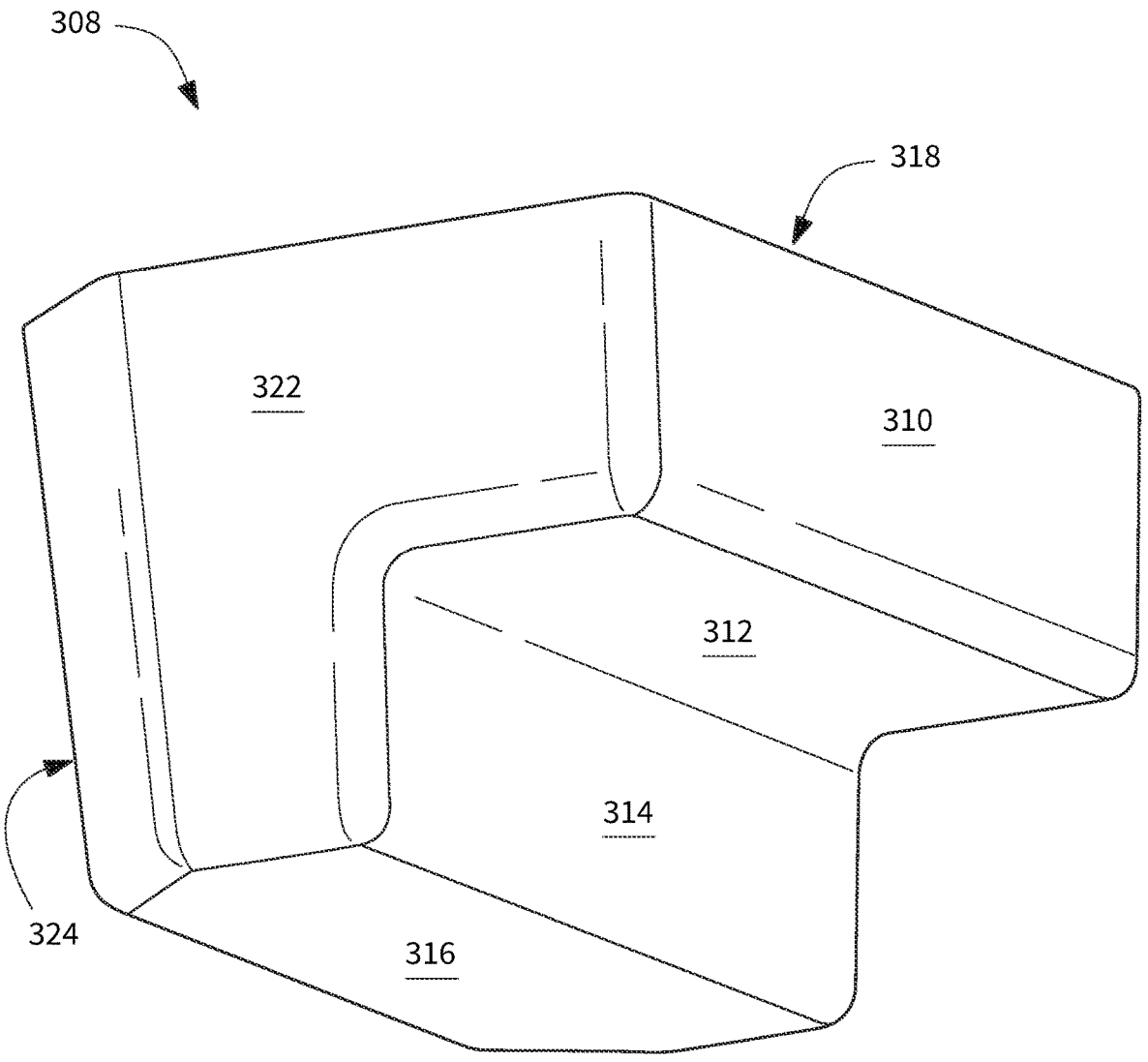
FIG. 12 provides a perspective view of a foot of the exemplary cover of FIGS. 10 and 11.

As may be seen, e.g., in FIG. 12, each foot 308 may include the upper portion, e.g., as mentioned above, which is bounded by the top surface 318 of the foot 308 and the middle surface 312 along the vertical direction V, and which extends from the first outer surface 310 to an inner surface 324 of the foot 308 along a direction generally perpendicular to the vertical direction V, such as one of the lateral direction L or the transverse direction T. Each foot 308 may also include a lower portion below the upper portion, such as the lower portion of the foot 308 may extend below the middle surface 312 to the bottom surface 316 along the vertical direction V, and the lower portion of the foot 308 may extend along the direction generally perpendicular to the vertical direction V, e.g., the one of the lateral direction L or the transverse direction T, from the second outer surface 314 to the inner surface 324 of the foot 308.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance defining a vertical direction, a lateral direction, and a transverse direction, wherein the vertical direction, the lateral direction, and the transverse direction are mutually perpendicular, the cooktop appliance comprising:

a top panel;

a burner disposed on the top panel;

a grate mounted on the top panel; and a cover selectively mountable to the grate and fully removable from the grate, the cover comprising:

a panel defining a top surface and a bottom surface, the top surface and the bottom surface spaced apart along the vertical direction when the cover is in a mounted position on the grate and the grate is in a mounted position on the top panel; and a plurality of feet attached to the bottom surface of the panel, each foot of the plurality of feet configured to interface with the grate when the cover is in the mounted position on the grate, wherein each foot of the plurality of feet comprises a first outer surface, a second outer surface, and a middle surface, the second outer surface generally parallel to the first outer surface, the middle surface adjoining the first outer surface at a first edge of the middle surface and adjoining the second outer surface at a second edge of the middle surface opposite the first edge, the second outer surface of each foot facing one of the lateral direction or the transverse direction when the cover is in the mounted position on the grate, the second outer surface of one or more feet of the plurality of feet in contact with the grate when the cover is in the mounted position on the grate, the middle surface of each foot facing downwards along the vertical direction, the middle surface of each foot resting on an upper surface of the grate when the cover is in the mounted position on the grate, and the first outer surface extending away from the grate starting at the first edge of the middle surface when the cover is in the mounted position on the grate.

2. The cooktop appliance of claim 1, wherein the top surface of the panel is uninterrupted and spans continuously across all burners of the cooktop appliance along the transverse direction when the cover is in the mounted position on the grate.

3. The cooktop appliance of claim 1, wherein the top surface of the panel is uninterrupted and spans continuously across all burners of the cooktop appliance along the lateral direction when the cover is in the mounted position on the grate.

4. The cooktop appliance of claim 1, wherein the panel is spaced apart from the grate above the grate along the vertical direction when the cover is in the mounted position on the grate.

5. The cooktop appliance of claim 1, wherein each foot of the plurality of feet comprises a silicone material.

6. The cooktop appliance of claim 1, wherein the panel comprises tempered glass.

7. The cooktop appliance of claim 1, wherein the panel comprises a pencil edge extending fully around a perimeter of the panel.

8. A cover for a cooktop appliance, the cooktop appliance defining a vertical direction, a lateral direction, and a transverse direction, wherein the vertical direction, the lateral direction, and the transverse direction are mutually perpendicular, the cooktop appliance comprising a top panel, a burner disposed on the top panel, and a grate mounted on the top panel, the cover selectively mountable to the grate and fully removable from the grate, the cover comprising:

a panel defining a top surface and a bottom surface, the top surface and the bottom surface spaced apart along the vertical direction when the cover is in a mounted position on the grate and the grate is in a mounted position on the top panel; and a plurality of feet attached to the bottom surface of the panel, each foot of the plurality of feet configured to interface with the grate when the cover is in the mounted position on the grate, wherein each foot of the plurality of feet comprises a first outer surface, a second outer surface, and a middle surface, the second outer surface offset from the first outer surface, the middle surface adjoining and extending between the first outer surface and the second outer surface, the first outer surface and the second outer surface of each foot facing one of the lateral direction or the transverse direction when the cover is in the mounted position on the grate, the second outer surface of one or more feet of the plurality of feet in contact with the grate when the cover is in the mounted position on the grate, the middle surface of each foot facing downwards along the vertical direction, the middle surface of each foot resting on an upper surface of the grate when the cover is in the mounted position on the grate, wherein an upper portion of the foot is bounded by the first outer surface and the middle surface.

9. The cover of claim 8, wherein the top surface of the panel is uninterrupted and spans continuously across all burners of the cooktop appliance along the transverse direction when the cover is in the mounted position on the grate.

10. The cover of claim 8, wherein the top surface of the panel is uninterrupted and is configured to span continuously across all burners of the cooktop appliance along the lateral direction when the cover is in the mounted position on the grate.

11. The cover of claim 8, wherein the panel is configured to be spaced apart from the grate above the grate along the vertical direction when the cover is in the mounted position on the grate.

12. The cover of claim 8, wherein each foot of the plurality of feet comprises a silicone material.

13. The cover of claim 8, wherein the panel comprises tempered glass.

14. The cover of claim 8, wherein the panel comprises a pencil edge extending fully around a perimeter of the panel.

* * * * *